United States Patent [19]
Matsko et al.

[11] 3,821,607
[45] June 28, 1974

[54] CIRCUIT INTERRUPTER PROTECTIVE DEVICE

[75] Inventors: Joseph J. Matsko, Coraopolis; Robert H. Hill, Beaver Falls; Emroy W. Lange, Beaver, all of Pa.

[73] Assignee: Westinghouse Electric Corporation, Pittsburgh, Pa.

[22] Filed: Dec. 29, 1972

[21] Appl. No.: 319,824

[52] U.S. Cl. ........... 317/33 R, 200/168 R, 220/4 R, 317/46
[51] Int. Cl. ............................................. H02h 1/00
[58] Field of Search ................ 317/46, 18 D, 33 R; 335/174; 200/168 R; 74/52 R, 59, 65 R; 220/4 F, 4 B, 4 R

[56] References Cited
UNITED STATES PATENTS
2,590,804  3/1952  Vatale .................... 174/52 R
3,168,613  2/1965  Palmer .................... 174/65 R
3,530,414  9/1970  Wagner .................... 335/174
3,636,482  1/1972  Edmunds .................. 317/18 D
3,717,792  2/1973  Gryctko ................... 317/18 D Primary Examiner—James D. Trammell
Attorney, Agent, or Firm—L. P. Johns

[57] ABSTRACT

A circuit interrupter protective device characterized by a circuit breaker, a trip member, a solid-state static sensoring means, and a first insulating housing therefor; the solid-state static sensoring means being contained within a second insulating housing within the first insulating housing; and the trip member being contained within a third insulating housing within the first insulating housing.

4 Claims, 7 Drawing Figures

3,821,607

CIRCUIT INTERRUPTER PROTECTIVE DEVICE

BACKGROUND OF THE INVENTION

1. Field of the Invention:

This invention pertains to a protective device for a circuit interrupter and more particularly it pertains to an insulating housing that contains monitoring and/or sensoring means entirely contained within the outer housing of the circuit breaker.

2. Description of the Prior Art:

Most prior known circuit breakers that comprise overcurrent protective devices provide for external mounting of such devices on the circuit breaker housing, such as disclosed in U.S. Pat. No. 3,530,414, issued Sept. 22, 1970 to Howard A. Wagner. The circuit breakers of that type have functioned satisfactorily for responding to such abnormal currents as overcurrents, ground fault currents, and short circuits that occur in an electrical distribution system. It has been found, however, that certain disadvantages prevailed with that type of construction including field installation and undue exposure of the monitoring and sensor devices to air-borne contaminants and the like.

SUMMARY OF THE INVENTION

In accordance with this invention, it has been found that the foregoing disadvantages may be overcome by providing a protective device for a circuit interrupter which device is contained within a substantially airtight container that is, in turn, contained within the overall insulating housing of the circuit breaker, and which comprises a circuit breaker, a trip member for the circuit breaker, a trip actuator for actuating the trip member, solid-state static sensor means connected to current monitoring transformers which means are contained within an insulating housing that is contained within an outer housing of the circuit breaker, the trip member, and the trip actuator.

The advantage of the device of this invention is that it provides for a molded case having a simplified construction comprising a three piece housing including two symmetrical covers and a front panel with interlocking grooves for excluding the dirt and eliminating other environmental problems. Other advantages include a factory assembly including captured transformers in simplified mountings, the wiring of potentiometers, terminals, and transformers as a complete subassembly, and a "tamper-proof" installation.

DESCRIPTION OF THE PREFERRED EMBODIMENTS

Figure 1:
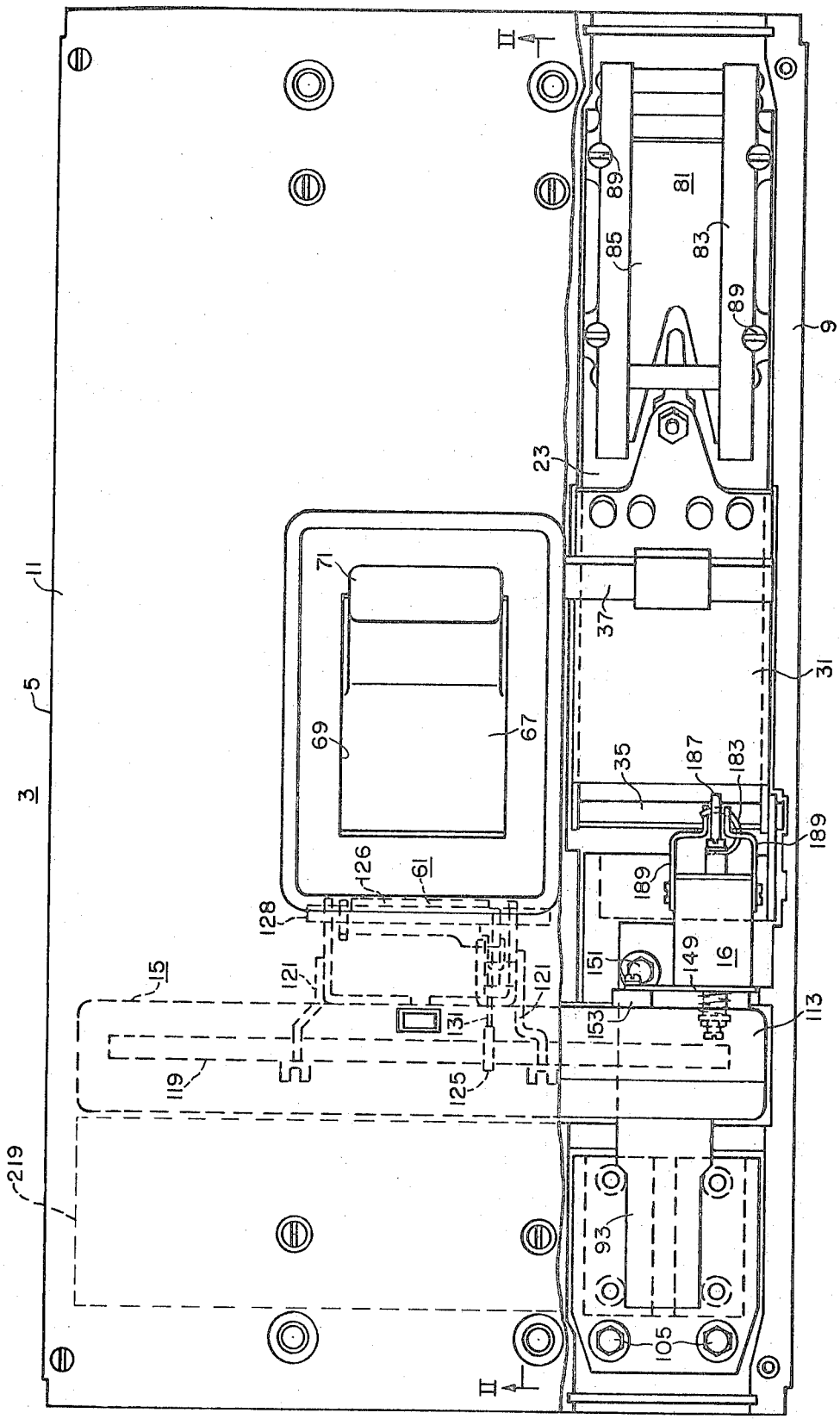
FIG. 1 is a top plan view, with parts broken away, of a circuit breaker constructed in accordance with the principles of this invention.
Figure 2:
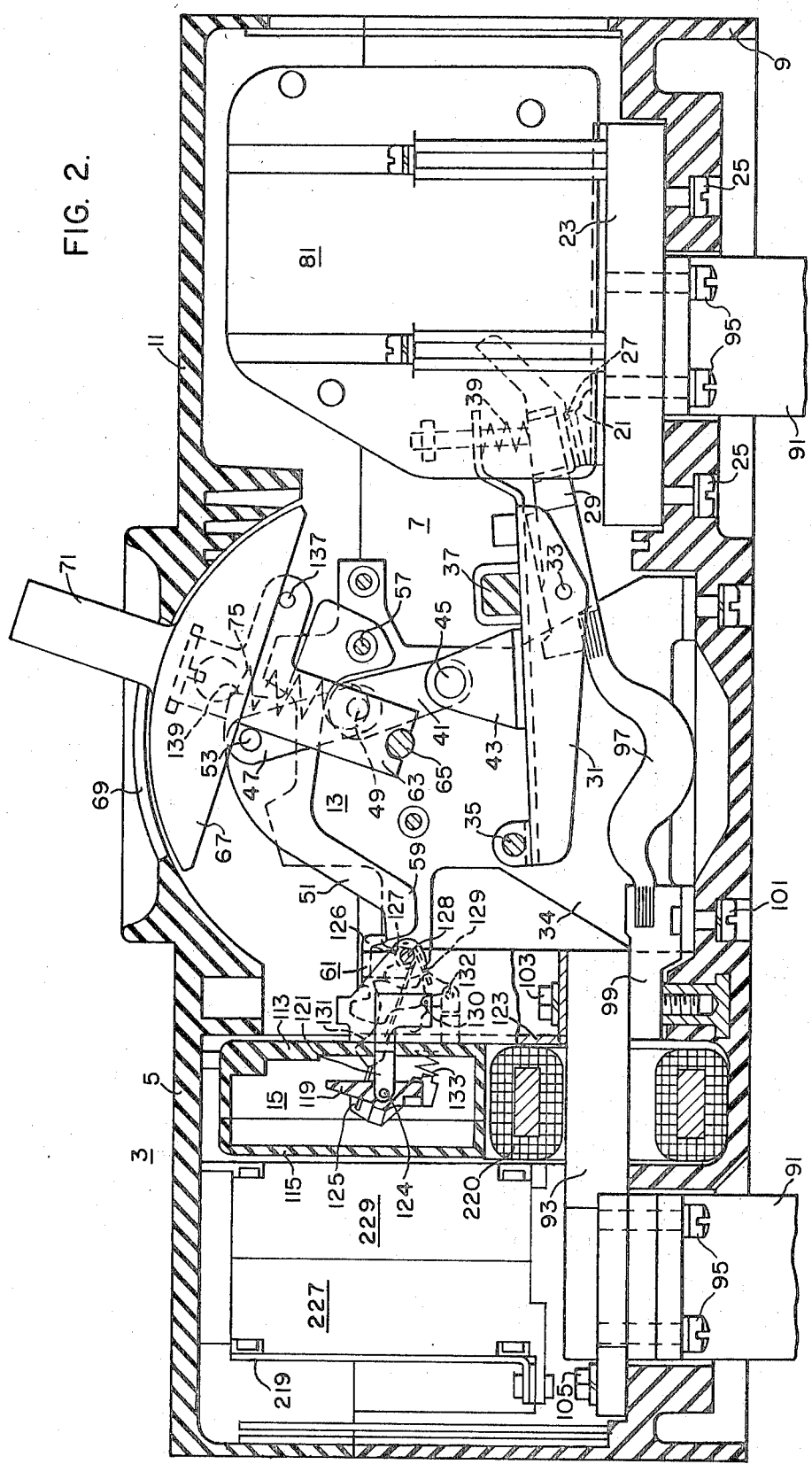
FIG. 2 is a sectional view, with parts broken away, taken generally along the line II—II of FIG. 1.
Figure 3:
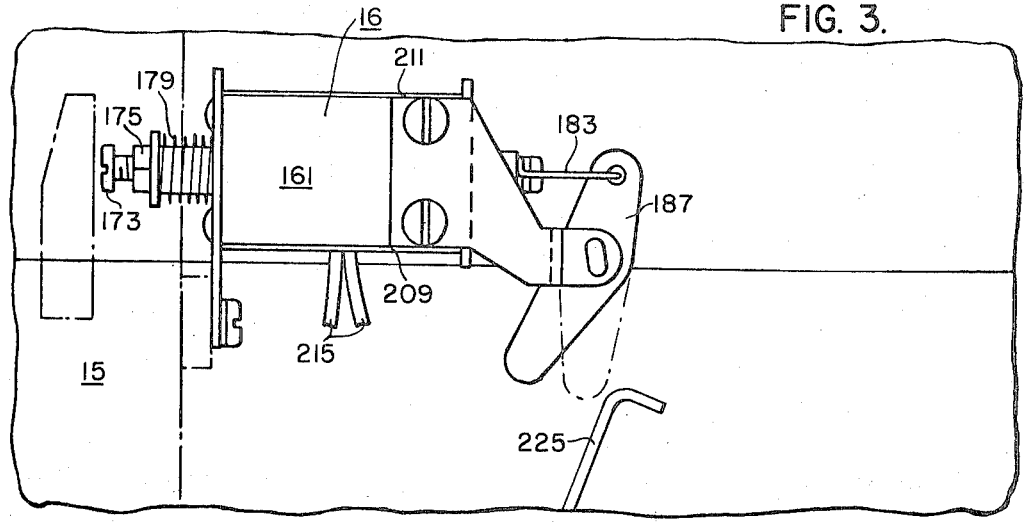
FIG. 3 is a sectional view, with parts broken away, taken generally along the line III—III of FIG. 1.

In FIGS. 1–3, a circuit breaker is generally indicated at 3 and it comprises an insulating housing 5 and a circuit-breaker mechanism 7 supported within the housing. The housing 5 comprises an insulating base 9 and an insulating cover 11 mounted on the base 9.

The circuit-breaker mechanism 7 comprises an operating mechanism 13, a latch and trip device 15, and a trip actuator 16. Except for the latch and trip device 15 and trip actuator 16, the circuit breaker 3 is of the type that is more specifically described in the patent to Albert R. Cellerini et al, U.S. Pat. No. 3,287,534, issued Nov. 22, 1966. The circuit breaker 3 is a three-pole circuit breaker comprising three compartments disposed in a side-by-side relationship. The center pole compartment (FIG. 2) is separated from the two outer pole compartments by insulating barrier means formed with the housing base 9 and cover 11. The operating mechanism 13 is disposed in the center pole compartment and is a single operating mechanism for operating the contacts of all three pole units.

Each pole unit comprises a stationary contact 21 that is fixedly secured to a rigid main conductor 23 that is secured to the base 9 by means of bolts 25. In each pole unit, a movable contact 27 is welded or brazed to a contact arm 29 that is pivotally mounted on a switch arm 31 by means of a pivot pin 33. Each of the arms 33 is pivotally supported at one end thereof on a support bracket 34 by means of a pivot pin 35. The switch arms 31 for all three of the pole units are connected to move in unison by means of a common insulating tie bar 37 that is rigidly connected to all three of the switch arms. Each of the contact arms 29 is biased about the associated pivot 33 by means of a spring 39 to provide contact pressure in the closed position.

The switch arms 31 are operated or actuated to the open and closed positions by means of the operating mechanism 13 (FIG. 2). The operating mechanism 13 comprises a toggle link 41 that is pivotally connected to an extension 43 of the centerpole switch arm 31 by means of a pivot pin 45. The toggle link 41 is pivotally connected to another toggle link 47 by means of a knee pivot pin 49. The upper end of the toggle link 47 is pivotally connected to a cradle or releasable member 51 by means of a pivot pin 53. The releasable member 51 is pivotally supported at one end thereof on the supporting bracket 34 by means of a pivot pin 57. The other end 59 of the releasable member 51 is held in a latched position by means of a latch structure 61. The operating mechanism 13 also comprises a generally U-shaped operating lever 63 that is pivotally supported on the bracket 34 by means of pins 65 that engage the inner ends of the legs of the operating lever 63. An insulating shield 67, that substantially closes an opening 69 in the cover 11, is secured to the upper end of the operating lever 63. The shield 67 has an integral insulating handle portion 71 that extends out through the opening 69 to permit manual operation of the braker. Two over-center springs 75 (only one being shown in FIG. 1) are connected under tension between the knee pin 49 of the toggle 41, 47 and the upper end of the operating lever 63.

In each pole unit, an arc-extinguishing unit 81 is provided to extinguish the arcs drawn between the associated contacts 21, 27. Each arc-extinguishing unit comprises an insulating housing 83 and a plurality of magnetic steel plates 85 (FIG. 1) supported within the housing 83. The moving contact 27 moves within a generally V-shaped opening 87 (FIG. 1) in the stacked plates 85, and the arc drawn between the contacts 21, 27 magnetically moved to the right (FIGS. 1–3) into the plates 85 to be extinguished during circuit interruption. Each of the arc-extinguishing units 81 is secured to the associated main conductor 23 (FIGS. 1–3) by means of four bolts 89 that are threaded into tapped openings in the conductor 23.

For each pole unit, the circuit breaker 3 is provided with two rear-type terminal connectors 91 that are secured to flat undersurfaces of internal conductors 23, 93 by bolt means 95. As can be seen in FIGS. 2 and 3, the terminal connectors 91 extend through suitable openings in the bottom of the insulating base 9.

The circuit through each pole unit of the circuit breaker 3 extends from the right-hand terminal 91 through the conductor 23, the contacts 21, 27, the contact arm 29, a flexible conductor 97 that is secured to the contact arm 29, a terminal member 99 that is secured to the base 9 by means of a bolt 101, a unitary rigid main conductor 93 that is secured to the terminal 99 by bolt means 103, to the other terminal connector 91. Bolt means 103 and additional bolt means 105 fixedly secure the conductor 93 on the base 9.

The circuit breaker 3 is manually operated to the open position by movement of the handle 71 in a counterclockwise (FIG. 2) direction from the "ON" to the "OFF" position. During this movement, the line of action of the overcenter springs 75 is moved to the left to an overcenter position to effect collapse of the toggle 41, 47 to pivot the switch arm 31 for the center pole in a counterclockwise direction about the associated pivot 35 to an open position which movement, because of the connection of all of the switch arms 31 by means of the common tie bar 37, simultaneously moves all of the three switch arms 23 and contact arms 29 to the open position.

The circuit breaker is manually closed by reverse movement of the handle 71 from the "OFF" position to the "ON" position. This movement moves the operating lever 63 to move the line of action of the overcenter springs 75 to the right to thereby erect the toggle 41, 47 moving all three of the switch arms 31 simultaneously to the closed position seen in FIGS. 2 and 3.

The latch and trip device 15 comprises a molded insulating base 113 and a molded insulating cover 115 secured to the base to enclose a molded insulating trip bar 119 that is common to all three of the pole units. The trip bar 119 is pivotally supported on a bracket 121 that extends out of the base 113. The bracket 121 is supported on a supporting bracket 123 that is secured on the base 9 by means of the bolt 103. The trip bar 119 is supported on pivot pin means 124. The trip bar 119 comprises a metallic latch piece 125 that is fixedly secured in the insulating material of the trip bar during the molding of the trip bar. The latch structure 61 comprises a trigger latch 126 having slot means 127 therein that receives a pin 128, that is mounted on the bracket 123, to mount the latch 126 for pivotal and sliding movement on the pin 128. The trigger latch 126 is biased in a clockwise direction by a spring 129. The trigger latch is latched against counterclockwise movement by a roller 130 that is supported on a latch 131 that is pivotally mounted on the bracket 123 by means of a pin 132. The latch 131 engages the latch piece 125 of the trip bar 119 to prevent counterclockwise movement of the latch 131. The torsion spring 129 biases the latch 131 in a clockwise direction. When the trip bar 119 is rotated counterclockwise to the tripping position, the latch piece 125 releases the latch 131 which moves counterclockwise to release the trigger latch which moves counterclockwise to thereby release the member 51 which moves clockwise to trip the breaker. The torsion spring 129 resets the latches 126 and 131, and a compression spring 133 resets the trip bar. When the breaker is reset the member 51 wipes past the latch 126, with the slot 127 permitting sliding movement of the latch 126, to the reset position wherein the latch 126 again latches the member 51.

The circuit breaker is automatically tripped by operation of the trip actuator 16, in a manner to be hereinafter described, whereupon the trip actuator operates to rotate the trip bar 119 (FIG. 2) counterclockwise to release the latch structure 61. Upon release of the latch structure 61, the member 59 is released whereupon the springs 75 operate to rotate the member 59 in a clockwise direction about the pivot 57 and to collapse the toggle 41, 47 to thereby pivotally move the three switch arms 31 in a counterclockwise direction to the open position in a manner well known in the art.

During the automatic opening operation, the line of force of the springs 75 operates to move the operating lever 63 and handle 71 to an intermediate position between the "ON" and the "OFF" operations in a well known manner to thereby provide a visual indication that the circuit breaker has automatically been tripped.

Following an automatic tripping operation, it is necessary to reset and relatch the circuit breaker mechanism before the contacts can be closed. This is effected by moving the handle 71 to the full "OFF" position. During this movement, a pin 137 that is supported on the operating lever 63, engages a shoulder 139 on the member 51 moving the member 51 in a counterclockwise direction about the pivot 57. Near the end of this movement, the free or latching end 59 of the cradle cams pass the latch 126 to a reset position wherein the cradle 59 is again latched by means of the latch structure 61. The breaker contacts can then be closed in the previously described manner by movement of the handle 71 to the "ON" position.

A single trip actuator 16 (FIGS. 1 and 3–6) is mounted in one of the outer pole units (the lowermost pole unit as seen in FIG. 1) of the circuit breaker 3. The trip actuator 16 comprises a non-magnetic plate 149 that is secured to the base 113 of the latch and trip device 15 by means of a pair of bolts 151 that extend through the plate 149 and that are threaded into trapped inserts in insulating projections 153 that are molded integral with the member 113. A sheet metal U-shaped magnetic frame member 155 is fixedly secured, at the free ends of the legs thereof, to the non-magnetic plate 149. As can be seen in FIGS. 5 and 6, the U-shaped magnetic frame 155 comprises a pair of parallel legs or side magnetic means 157 and a magnetic end part or bight part 159. An elongated armature structure 161 comprises an elongated non-magnetic rod 163 and a tubular magnetic armature 165 supported on the rod intermediate the ends of the rod. The armature 165 is fixedly secured on the rod 163 by pin means 167. The non-magnetic rod 163 comprises a first end part 169 that protrudes through an opening in the non-magnetic plate 149 and a second end part 171 that protrudes through an opening in the bight portion 159 of the magnetic frame 155. The openings in the plate 149 and bight portion 159 that received the rod 163 are large enough to permit free movement of the rod 163 and small enough to guide the rod 163 for rectilinear reciprocal movement. The rod 163 is provided with a tapped opening at the end 169 thereof for receiving a bolt 173 that is threaded into the tapped opening, to permit adjustment of the trip actuator. A nut 175 on the bolt 173 fixes a washer 177 against the end of the rod 163 with the washer 177 serving as a spring support for a compression spring 179 that operates between the washer 177 and plate 149 to bias the armature structure 161 to the left as seen in FIGS. 5 and 6. A bolt 181 is threaded into the other end 171 of the rod 163 to capture one end of a C-shaped spring 183 on the rod 163. The other end of the C-shaped spring 183 protrudes through an opening 185, FIG. 4 in a lever 187 that is pivotally supported intermediate the ends thereof on a pair of brackets 189 by means of a pin 191 (FIG. 4).

As can be seen in FIGS. 5 and 6, the brackets 189 are fixedly supported on the frame 155 by screws 195. An insulated conducting coil 201 is supported in the frame 155 around the armature 165 with the center opening of the coil 201 being large enough to permit rectilinear movement of the armature structure 161 therethrough. A pair of permanent magnet members 203 and 205 are supported in the frame 155 on opposite sides of the armature structure 161. During assembly of the trip actuator 16, after the coil 201, armature structure 161 and permanent magnet 203, 205 are in place between the legs of the U-shaped magnetic frame 155, a pair of insulating plates 209 and 211 (FIG. 4) are mounted in position between the bight portion 159 of the frame 155 and the non-magnetic plate 149 to close off the two open sides of the frame 155. The lower insulating plate 209 is provided with an opening therein for receiving a pair of insulated conductors 215 that are connected to the coil.

The conductors 215 extend from the trip actuator 16 to an overcurrent protective device that is contained within an insulating housing 219 that is mounted internally of the circuit breaker housing 9, 11. The overcurrent protective device, is of the type more particularly described in the U.S. Pat. No. 3,602,783, Joseph C. Engel and Robert T. Elms, issued Aug. 31, 1971. Among other things the protective device comprises a solid-state adjustable static sensor that operates in response to a signal from anyone of three transformer type current monitors to pulse the coil 201 of the trip actuator 16 with a D.C. current. As the current monitors, one of which monitors 220 is shown in FIG. 2 on the internal conductor 93, detect overload currents, short circuit currents, and ground fault currents, signals generated by the occurrence of any such current are passed to the static sensor which in turn pulses the coil 201 to trip the breaker. The static sensor is adjustable to provide a variety of timecurrent tripping curves thereby providing designers of systems, switchboards, and power centers with flexibility for obtaining selective tripping as well as excellent coordination with breakers or protective devices in an electrical system. As shown in FIG. 2, the current monitoring transformers 220 are contained within the molded insulating cover 115 through which the conductors 93 extend.

Figure 4:
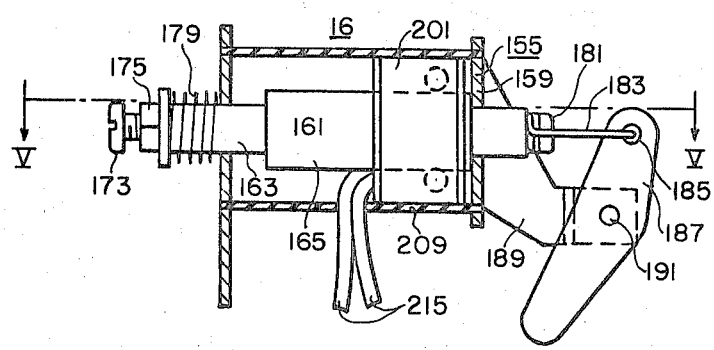
FIG. 4 is a sectional view of the trip actuator taken generally along the line IV—IV of FIG. 5.
Figure 5:
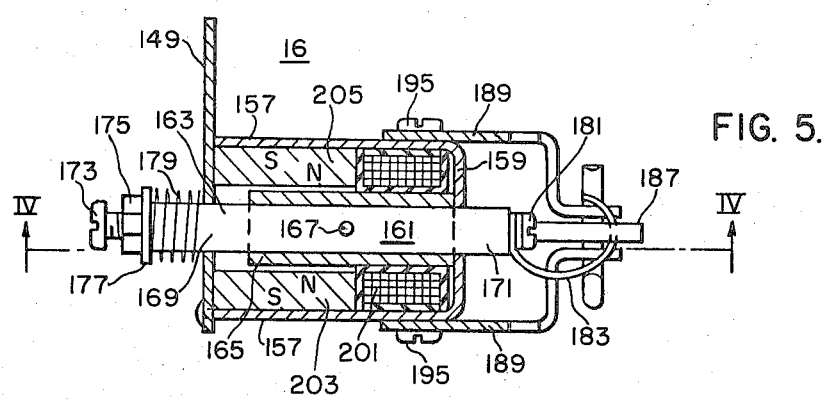
FIG. 5 is a sectional view taken generally along the line V—V of FIG. 4.
Figure 6:
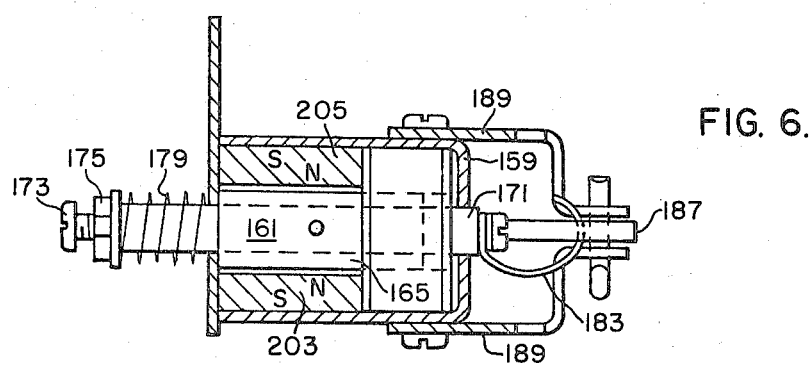
FIG. 6 is a view similar to FIG. 5 with the armature structure being shown in the actuating or tripping position.

Referring to FIGS. 4 and 5, the trip actuator 16 is shown therein in the initial or non-tripping position. The armature structure 161 is maintained in this initial position against the bias of the spring 179 by the magnetic flux that is supplied by the permanent magnets 203, 205. The magnetic flux from the permanent magnet 205 works in a magnetic circuit that extends from the magnet 205 through the small air gap between the magnet 205 and armature 165, the armature 165, the bight portion 159 of the magnetic frame 155, the upper leg 157 (FIG. 5) of the magnetic frame 155 back through the permanent magnet 205. The magnetic flux from the permanent magnet 203 works in a magnetic circuit from the magnetic member 203, through the small air gap between the magnetic member 203 and armature 165, the armature 165, the bight portion 159 of the magnetic frame 155, through the lower leg 157 (FIG. 5) of the Magnetic frame 155 back through the permanent magnet 203. The magnetic flux from the permanent magnets 203, 205 is strong enough to maintain the armature structure 161 in the initial or nontripping position seen in FIGS. 4 and 5 in which position the armature 165 engages the bight portion 159 of the magnetic frame 155. When the coil 201 is pulsed by the DC current from the overcurrent protective device 219, the reluctance of the above-mentioned magnetic circuits is increased and the spring 179 overcomes the holding force of the magnets 203, 205, whereupon the armature structure 161 is snapped to the left moving to the tripping position seen in FIG. 6 which position is limited by the engagement of the armature 165 with the nonmagnetic plate 149. Upon movement of the armature structure 161 to the tripping position the screw 173 engages the trip bar 119 (FIGS. 1–3) to pivot the trip bar 119 counterclockwise (FIGS. 2 and 3) to the tripping position to effect a tripping operation in the manner hereinbefore described.

As the circuit breaker contacts are moved to the open position, a bracket 225 (FIG. 3), that is fixedly supported on the switch arm 31 in the one pole unit of the breaker, moves against the lower end of the lever 187 to pivot the lever 187 clockwise from the tripping position seen in broken lines in FIG. 3 to the reset initial position seen in full lines. During this movement the lever 187, operating through the spring 183, pulls the armature structure 161 from the tripping position seen in FIG. 6 to the reset initial position seen in FIGS. 3–5. The force of the operating springs 75 moving the switch arms 31 to the open position is strong enough to easily overcome the force of the spring 179 of the trip actuator 161. As was hereinbefore set forth, the protective device 219 operates merely to pulse the coil 201 so that when the armature structure 161 is moved back to the reset position seen in FIGS. 3–5 the magnetic flux from the permanent magnets 203, 205 will automatically operate to maintain the armature structure 161 in the initial position, and when the circuit breaker is reset and closed, with the bracket 225 (FIG. 3) moving away from the lever 187, the armature structure 161 will be maintained in the initial position until the coil 201 is again pulsed to effect another tripping operation. With the armature structure 161 in the tripping position seen in FIG. 6, the flux from the magnetic members 203 and 205 cooperates with the spring 179 to maintain the armature structure 161 in the tripping position.

As can be understood with reference to FIG. 6, the flux from the magnet 203 operates through the magnet 203, the space between the magnet 203 and armature 165, the non-magnetic gap (on the left as seen in FIG. 6) which includes the non-magnetic plate 149, through the lower leg 157 of the magnetic frame and through the permanent magnet 203. The flux from the permanent magnet 205 operates through the magnet 205, the small gap between the magnet 205 and armature 165, the armature 165, the non-magnetic gap (on the left as seen in FIG. 6) which includes the non-magnetic plate 149, the upper magnetic leg 157 of the magnetic frame 155 and back through the permanent magnet 205. Since some of the magnetic flux from the permanent magnetic members 203 and 205 still operates through the armature 165 and the gap on the right (FIG. 6) between the armature 165 and through the bight portion 159 of the magnetic frame and back through the legs of the magnetic frame 155, the full force of the magnets 203 and 205 is not working against movement of the armature atructure 161 back to the initial or non-tripping position. Thus, it is only necessary that the combination of the spring force 179 and the magnetic flux from the magnet members 203, 205 be sufficient to provide a stable tripping position as seen in FIG. 6 and not so great as to significantly resist closing movement of the switch arm 31 (FIG. 3) which resets the armature structure 161.

As was hereinbefore set forth, the elongated rod 169 is non-magnetic. Thus, when the armature structure 161 is in the tripping position seen in FIG. 6, there is a non-magnetic gap between the armature 165 and the bight portion 159 of the magnetic frame 155. Moreover, the non-magnetic rod 169 can move freely between the two positions thereof guided in the bight portion 159 of the magnetic frame 155.

With the spring member 183 connecting the lever 187 and armature structure 161, manufacturing tolerances and positioning of parts in the breaker is less critical in that if the bracket 225 (FIG. 3) moves past the position which resets the armature structure 161 in the initial position, the spring 183 will flex without applying damaging forces to the parts of the trip actuator 161.

Figure 7:
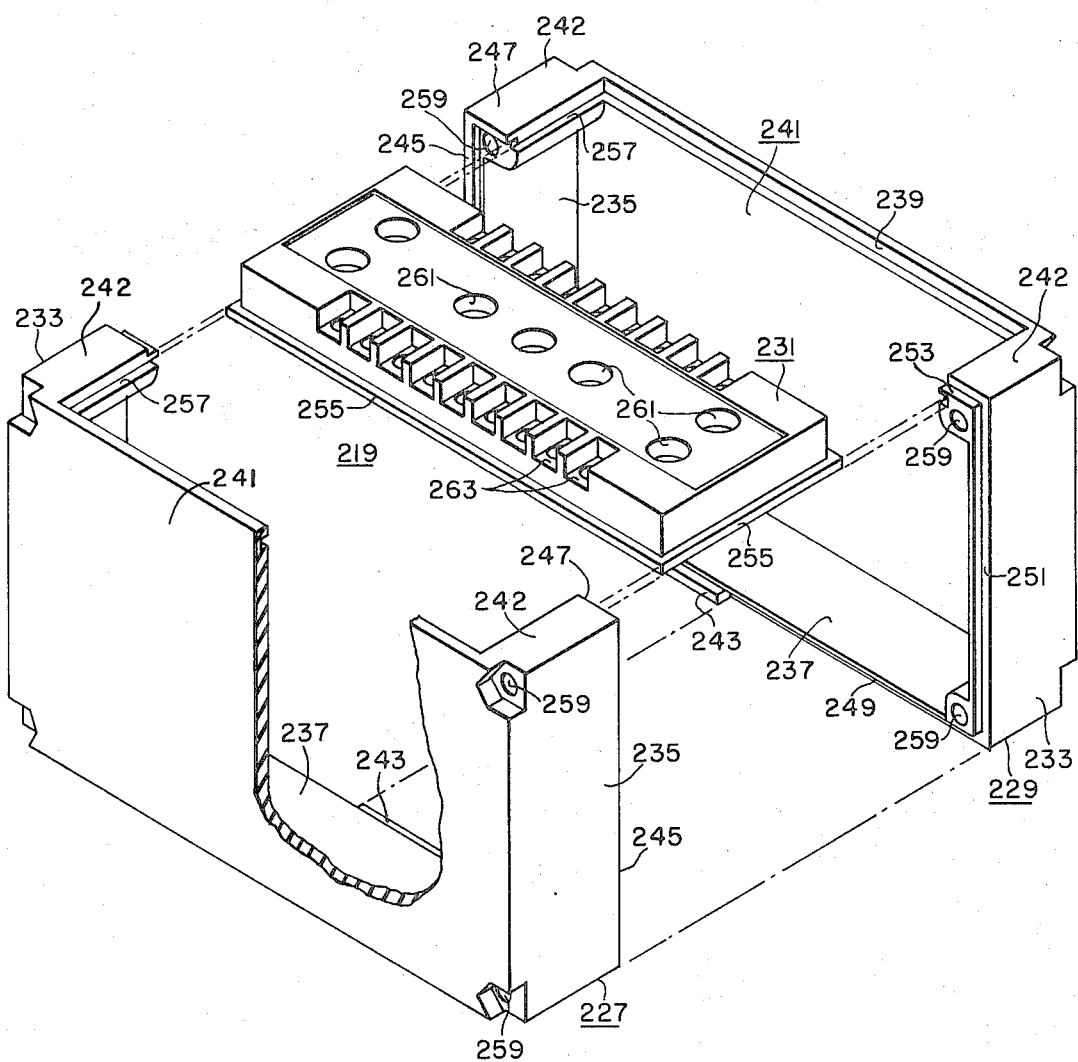
FIG. 7 is an exploded view of the insulating housing of the invention.

In FIG. 7, the housing 219 is disclosed in an exploded view and comprises three portions including identical half portions 227 and 229 and a front panel or closure portion 231. The half portions 227 and 229 are composed of an electrically insulating material such as thermosetting resin and may be molded in the same mold. The portions 227, 229, 231 comprise interfitting ridges and grooves which when fitted together provide a substantially air-tight or contamination free housing in which the overcurrent protective device is contained. The half portions 227 and 229 include similar opposite end walls 233 and 235, edge walls 237 and 242 and an opening 239 in the edge wall 242 opposite the wall 237. All of said walls extend substantially vertically from the side wall 241. The upper ends of the walls 233, 235, 237 have interfitting edges which fit corresponding edges of the half portion 227. The mating edges comprise an upstanding ridge including ridge segments 243, 245 and 247 ascending along the walls 237, 235, and 242, respectively. The mating surfaces also include notches comprising notched segments 249 extending along the walls 237, 233 and 242, respectively. The ridge segment 243 and the notched segment 249 on the edge wall 237 extends substantially to the mid-point between the end walls 235 and 233. Thus, when the identical half portion 227 and 229 are placed together in inverted position the ridge and notch segment 243, 253 provide an interfitting engagement along the mating surfaces with the ridge segment of one-half portion extending into the notched segments of the other half portion.

The closure portion 231 includes a peripheral ridge 255 around all sides thereof which ridge engages aligned notched segments 257 in the side wall 242 of the half portions 227 and 229. Aligned apertures 259 are provided at the corners of the half portions 227 and 229 so that suitable fastening means, such as elongated nut and bolt assemblies (not shown), may be used for holding the assembly of portions 227, 229, and 231 together.

As shown in FIG. 7 the closure portion 231 is provided with aperture means, such as spaced holes 261, through which suitable manual control knobs extend for adjustment of the overcurrent protective device contained within the housing 219. In addition, the opening means include spaced notches in which terminals may be located for connection between conductors within an outside of the housing 219. A suitable nameplate (not shown) may be provided on the front face of the closure portion 231 in order to provide labels for the various knob and terminal positions.

Accordingly, the device of the present invention containment provides a molded housing which comprises an assembly of three interlocking members for containing suitable electronic static sensor means which cooperates for the circuit breaker to provide overcurrent protection. Moreover, the molded housing is adapted for containment within the outer housing of the circuit breaker whereby assembly of the overcurrent protective device is enabled at the point of manufacture rather than at the location of installation.

What is claimed is:

1. A circuit interrupter protective device for responding to abnormal currents in the conductors of an electrical distribution system and for actuating a circuit interrupter to open upon the occurrence of predetermined operating conditions, comprising a circuit breaker having a first insulating housing, a circuit breaker mechanism within the housing and comprising separable contacts adapted to be connected as part of the distribution system, a trip member within the housing and being movable to effect opening of the contacts, a current monitoring transformer for each conductor of the distribution system, a trip actuator comprising an actuating coil and being operable to actuate the trip member, solid-state static sensing means connected to the current monitoring transformers and responsive to a signal from any of the transformers to pulse the actuating coil of the trip actuator, a second insulating housing containing the solid-state sensing means, the second insulating housing being mounted within the first insulating housing, the second insulating housing comprises an open side formed by the two housing members, a third housing closure member closing the open side and having interfitting edge and end portions engageable with corresponding edge and end portions of the two housing members, the third housing closure being retained in place against displacement by the peripheral portions of the opposite end and side walls when the two housing portions are assembled, and the third housing closure being removable from the open side only when the two housing portions are disassembled.

2. The circuit interrupter of claim 1 in which the two housing members are identical half portions of the second insulating housing.

3. The circuit interrupter of claim 2 in which the assembly of the housing members are secured together by fastening means.

4. The circuit interrupter protective device of claim 2 in which the second housing closure member comprises aperture means adapted to receive electric conductor terminals and control knobs for the solid-state static sensoring means.

* * * * *